United States Patent
Watanabe et al.

(10) Patent No.: US 9,485,509 B2
(45) Date of Patent: Nov. 1, 2016

(54) IMAGE COMPRESSION DEVICE, IMAGE COMPRESSION METHOD, IMAGE DECOMPRESSION DEVICE, AND IMAGE DECOMPRESSION METHOD

(71) Applicant: KABUSHIKI KAISHA TOSHIBA, Minato-ku (JP)

(72) Inventors: Takashi Watanabe, Kanagawa (JP); Atsushi Matsumura, Yokohama (JP); Tomoya Kodama, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 217 days.

(21) Appl. No.: 14/509,732

(22) Filed: Oct. 8, 2014

(65) Prior Publication Data
US 2015/0189270 A1     Jul. 2, 2015

(30) Foreign Application Priority Data

Oct. 8, 2013 (JP) ................................. 2013-211461

(51) Int. Cl.
| | |
|---|---|
| H04N 19/103 | (2014.01) |
| H04N 19/176 | (2014.01) |
| H04N 19/13 | (2014.01) |
| H04N 19/146 | (2014.01) |
| H04N 19/152 | (2014.01) |

(52) U.S. Cl.
CPC ............. *H04N 19/103* (2014.11); *H04N 19/13* (2014.11); *H04N 19/146* (2014.11); *H04N 19/176* (2014.11); *H04N 19/152* (2014.11)

(58) Field of Classification Search
USPC ........ 382/232–233, 239; 375/240.01–240.29
See application file for complete search history.

(56) References Cited

U.S. PATENT DOCUMENTS

| | | | | |
|---|---|---|---|---|
| 5,801,841 A | * | 9/1998 | Suzuki | H04N 1/41 375/E7.137 |
| 5,847,762 A | * | 12/1998 | Canfield | H04N 19/61 375/240.15 |
| 6,222,943 B1 | * | 4/2001 | Suga | G06T 9/005 358/426.14 |
| 7,835,906 B1 | * | 11/2010 | Miao | G10L 19/22 704/219 |

(Continued)

FOREIGN PATENT DOCUMENTS

| | | |
|---|---|---|
| JP | 2008-271213 A | 11/2008 |
| JP | 2013-175848 A | 9/2013 |

OTHER PUBLICATIONS

"10 Rate Control and Quantization Control", MPEG-2 Test Model 5 (TM5), Doc. ISO/IEC JTC1/SC29/WG11/No. 400, Apr. 1993, Chapter 10, pp. 61-65.

*Primary Examiner* — Ishrat I Sherali
(74) *Attorney, Agent, or Firm* — Oblon, McClelland, Maier & Neustadt, L.L.P

(57) ABSTRACT

An image compression device includes: a first encoder that encodes a target block included in a segment in a first encoding mode; a second encoder that encodes the target block in a second encoding mode using a fixed-length coding to obtain a second encoded data; a calculator that calculates an accumulated amount of the first encoded data of the blocks; a selector that selects an encoding mode to be used to encode the target block from among the first encoding mode and the second encoding mode; and a determiner that determines whether to encode encoding mode information according to a predetermined condition. The selector selects the second encoding mode if a sum of an accumulated amount and an amount of the second encoded data of all remaining blocks in a segment exceeds a target value.

18 Claims, 14 Drawing Sheets

(56) References Cited

U.S. PATENT DOCUMENTS

| | | | |
|---|---|---|---|
| 8,731,050 B2 * | 5/2014 | Chiba | H03M 7/40 375/240.02 |
| 8,867,614 B2 * | 10/2014 | Shiodera | H04N 19/00121 375/240.03 |
| 9,036,935 B2 * | 5/2015 | Watanabe | H04N 19/146 382/239 |
| 2011/0123127 A1 * | 5/2011 | Mima | H04N 19/46 382/239 |
| 2012/0121012 A1 * | 5/2012 | Shiodera | H04N 19/00121 375/240.03 |
| 2014/0270558 A1 | 9/2014 | Watanabe et al. | |

\* cited by examiner

```
encoded_unit_data( ) {
    if(VARIABLE_CODEC_MODE==1)
        codec_mode
    }
    else {
        codec_mode=MODE_2
    }
    if(codec_mode==MODE_1) {
        delta_qp
        pred_mode
        for(i=0; i<NUM_COEFF;i++)
            coeff[i]
        }
    }
    else if(codec_mode==MODE_2) {
        pred_mode
    }
}
```

*Fig. 7*

```
encoded_unit_data( ) {
    if(codec_mode == MODE_1) {
        delta_qp
        pred_mode
        for(i=0; i<NUM_COEFF; i++)
            coeff[i]
        }
    }
    else if(codec_mode == MODE_2) {
        pred_mode
    }
}
```

IMAGE COMPRESSION DEVICE, IMAGE COMPRESSION METHOD, IMAGE DECOMPRESSION DEVICE, AND IMAGE DECOMPRESSION METHOD

CROSS-REFERENCE TO RELATED APPLICATION

This application is based upon and claims the benefit of priority from Japanese Patent Application No. 2013-211461, filed on Oct. 8, 2013; the entire contents of which are incorporated herein by reference.

FIELD

Embodiments described herein relate generally to a device and a method to compress an image and to decompress an encoded image using a plurality of encoding modes.

BACKGROUND

In a background image encoding method using transformation/quantization, a rate control scheme adaptively switches a quantization scale based on an amount of encoded data that has previously been generated. That scheme operates so that amount of encoded data to converge on an intended value to control bit rate, and accordingly does not guarantee not exceeding the intended value.

In a one-pass encoding scheme, an amount of encoded data may exceed a target amount. If an encoder is implemented on hardware, a size of a bit stream has to be previously determined. In that case the bit stream is broken up when the size of the bit stream exceeds the target amount of encoded data.

In that regard, an encoding scheme has been proposed that avoids a stream buffer overflowing and failing. In that scheme, the minimum and the maximum amount of encoded data of each macro block is preliminarily determined. When an amount of encoded data of a target block exceeds the maximum amount, all the remaining macro blocks are encoded with the minimum amount of encoded data.

In that scheme, an encoding condition is selected according to whether the buffer will overflow or not. Generally, it is preferable that encoding in the minimum amount is not selected, because the image encoded by the minimum amount of encoded data is greatly deteriorated in image quality. In a background method, the minimum amount of encoded data is not sufficiently small, so there may be a problem that encoding in the minimum amount is easily selected.

BRIEF DESCRIPTION OF THE DRAWINGS

FIG. 7 is one example of syntax of encoded data.

DETAILED DESCRIPTION

Various embodiments will be described hereinafter with reference to the accompanying drawings. Items common to the embodiments will be given common reference symbols and will not be described redundantly.

Figure 16:
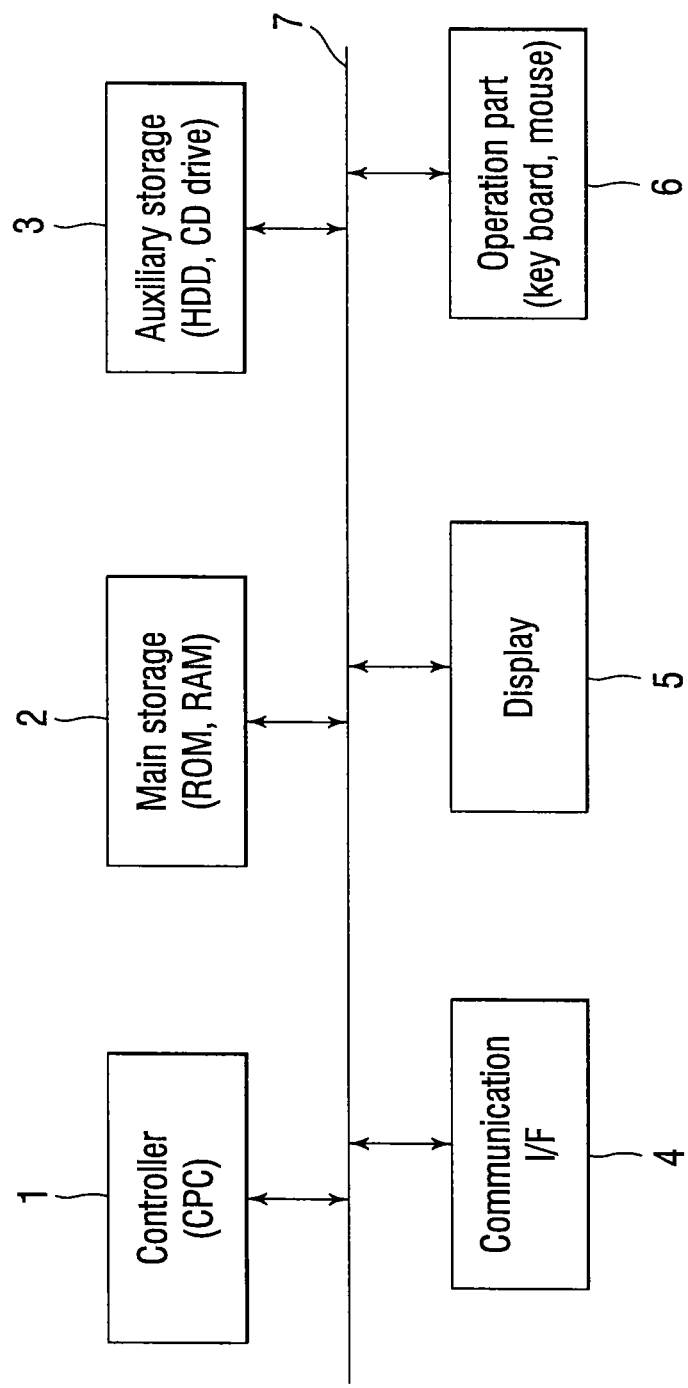
FIG. 16 is a diagram illustrating a hardware configuration the image compression device and the image decompression device.

FIG. 16 is an explanatory view illustrating a hardware configuration of the apparatus (an image compression device and an image decompression device) according to each of the embodiments. The image compression device and the image decompression device each include a controller 1, such as a CPU (a microprocessor, a Central Processing Unit) which controls the overall device, a main storage 2 such as a ROM (Read Only Memory) or a RAM (Random Access Memory) which stores various data or programs, an auxiliary storage 3 such as a HDD (Hard Disk Drive) or a CD (Compact Disk) drive which stores various data or programs, and a bus 7 connecting these elements.

The image compression device and the image decompression device wired or wirelessly communicate with a communication I/F (interface) 4 that controls communication with an external device, a display 5 to display an image, and an operation part 6 such as a keyboard or a mouse that receives inputs from a user.

For example, either data to be encoded or to be decoded is stored in the HDD, or input by the disk drive apparatus, or input externally via the communication I/F 4.

FIG. 16 shows a hardware configuration utilizing a conventional general purpose computer. Functions of the image compression device and the image decompression device according to each embodiment may be partly or wholly implemented by a general semiconductor integrated circuit such as a LSI (Large Scale Integration) or an IC (Integrated Circuit) tip set, or a customizable electronic circuit such as an FPGA (field programmable gate array).

Next, functional configurations of the image compression device and the image decompression device which are implemented as illustrated in FIG. 16 are described in each embodiment with reference to the drawings.

The First Embodiment

In the embodiments hereinafter, a coding unit into which inputted image to be encoded is divided is called a block, and a unit of encoded data is called a segment. The segment includes at least one block. The image compression device 100 (FIG. 1) according to the first embodiment does not limit the amount of encoded data which occurs in the process of coding each block. The image compression device 100 encodes inputted image so that the total amount of encoded data which occurs in the process of coding the segment does not exceed a predetermined target amount of encoded data. Each block includes at least one pixel. The block can be various sizes. Each segment includes at least one block. A combination of the blocks included in the same segment can be chosen arbitrarily. For example, the segment may include blocks in different frames. In embodiments described hereinafter, each block has pixels, and each segment has the blocks adjacent to each other.

Figure 1:
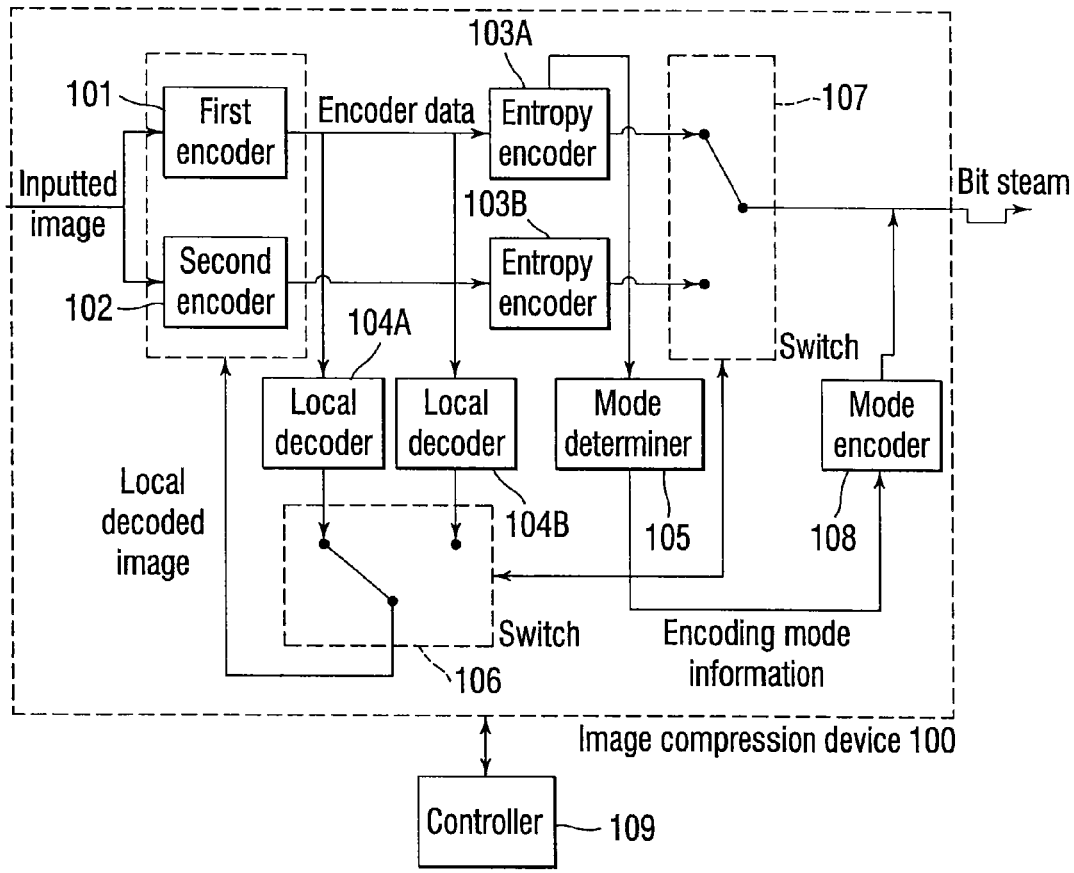
FIG. 1 is a block diagram illustrating an image compression device.

FIG. 1 shows an image compression device 100. The image compression device 100 includes a first encoder 101, a second encoder 102, an entropy encoder 103A, an entropy encoder 103B, a local decoder 104A, a local decoder 104B, a mode determiner 105, a switch 106, a switch 107, a mode encoder 108, and a controller 109.

The first encoder 101 encodes a target block included in an inputted image using a first encoding mode and generates a first encoded data. In the first encoding mode, the target block is encoded by transforming and quantizing so an amount of the first encoded data takes various values. The first encoder 101 sends the first encoded data to the entropy encoder 103A and the local decoder 104A. Further details about the encoding process are described below.

The second encoder 102 encodes the target block in a second encoding mode and generates a second encoded data. In the second encoding mode, the target block is encoded so that an amount of the second encoded data takes a value preliminarily determined. The second encoder 102 sends the second encoded data to the entropy encoder 103B and the local decoder 104B.

The entropy encoders 103A and 103B encode received encoded data using entropy encoding respectively and generate bit streams. The entropy encoder 103A sends a data amount information indicating an amount of data which occurs in a process of generating the bit stream to the mode determiner 105.

The local decoder 104A receives the encoded data from the first encoder 101. The local decoder 104B receives the encoded data from the second encoder 102. The local decoders 104A and 104B respectively decode each received encoded data, generate locally decoded images, and send the locally decoded images to the switch 106.

The mode determiner 105 receives the data amount information from the entropy encoder 103A. The mode determiner 106 sets encoding mode information based on the data amount information. The encoding mode information indicates whether to use the first encoding mode or the second encoding mode to encode the target block. If the amount of the encoded data generated by the first encoder 101 exceeds the target amount of encoded data, the mode determiner sets the encoding mode information to select the second encoding mode. The mode determiner 105 sends the encoding mode information to the switch 106, the switch 107, and the mode encoder 108.

The switch 106 receives the locally decoded images from the local decoder 104A and the local decoder 104B respectively. The switch 106 selects one of the locally decoded images in accordance with the encoding mode information determined by the mode determiner 105, and sends the selected locally decoded image to the first encoder 101 and the second encoder 102. If the encoding mode information indicates the first encoding mode, the locally decoded image generated by the local decoder 104A is sent to the first encoder 101 and the second encoder 102. If the encoding mode information indicates the second encoding mode, the locally decoded image generated by the local decoder 104B is sent to the first encoder 101 and the second encoder 102.

The locally decoded image sent to the first encoder 101 and the second encoder 102 is used to encode following blocks as a prediction image.

The switch 107 receives the encoding mode information from the mode determiner 105. The switch 107 receives the bit stream that is encoded in the first encoding mode from the entropy encoder 103A, if the encoding mode information indicates the first encoding mode. The switch 107 receives the bit stream that is encoded in the second encoding mode from the entropy encoder 103B, if the encoding mode information indicates the second encoding mode. The switch 107 outputs the received bit stream.

The mode encoder 108 receives the encoding mode information from the mode determiner 105. The mode encoder 108 encodes the encoding mode information using an entropy encoding technique. The mode encoder 108 superimposes the encoding mode information that is encoded using the entropy encoding technique on a bit stream received from the switch 107 for output. The process of the mode encoder 108 is described in detail below.

The controller 109 controls feed back of the amount of data that has been generated in encoding the target block, quantization, and the direction of prediction which are executed by the first encoder 101 and the second encoder 102.

Figure 2:
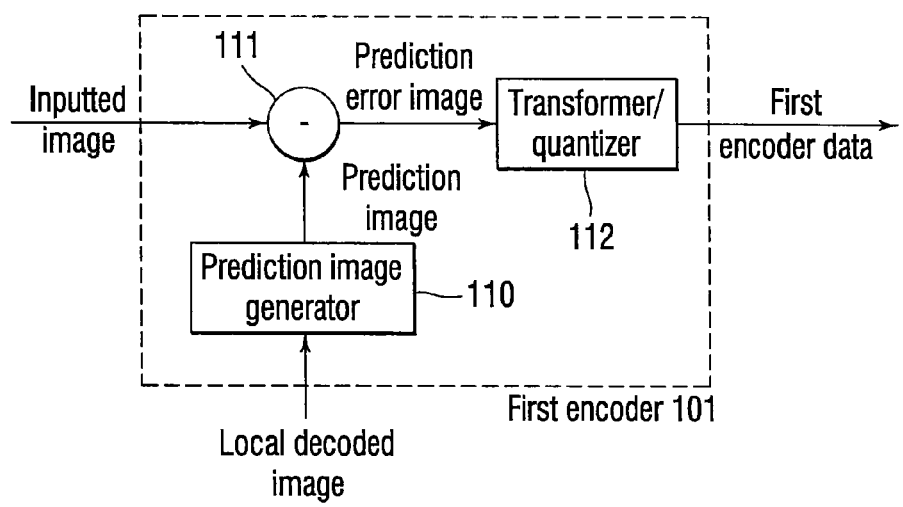
FIG. 2 is a block diagram illustrating a first encoder.

The first encoder 101 is described in detail referring to FIG. 2. FIG. 2 is a diagram illustrating the first encoder 101. The first encoder 101 includes a prediction image generator 110, a subtractor 111, and a transformer/quantizer 112.

The prediction image generator 110 receives the locally decoded image from the local decoder 104A. The prediction image generator 110 generates a prediction image corresponding to the target block in accordance with a given prediction process. The prediction image generator 110 sends the prediction image to the subtractor 111.

The prediction image generator 110 can use various techniques to generate the prediction image. In this embodiment, the prediction image generator 110 generates the prediction image by referring to a block adjacent to the target block. For example, the prediction image generator 110 uses a spatial prediction technique used in a conventional encoder such as AVC/H.264. In this embodiment, an example of the prediction image being generated by executing spatial prediction using a pixel value in a neighboring block is described. The direction of intra prediction is determined by the controller 109. The subtractor 111 receives a prediction image that is used to encode the target block in the inputted image, from the prediction image generator 110.

The subtractor 111 subtracts a pixel value of the target block from a pixel value of the prediction image and generates the prediction error image. The generated prediction error image is sent to the transformer/quantizer 112.

The transformer/quantizer 112 transforms the prediction error image received from the subtractor 111. the transformer/quantizer 112 transforms, for example, using an orthogonal transformation, such as DCT (Discrete Cosine Transform), and generates transform coefficients. The transformer/quantizer 112 could alternatively use various technique such as wavelet transform and independent component analysis to generate the transform coefficients. Next, the transformer/quantizer 112 quantizes the transform coefficients according to a quantization parameter set by the controller 109 and generates the encoded data. As described above, the first encoder 101 encodes the target block by transforming and quantizing the prediction error image.

Figure 3:
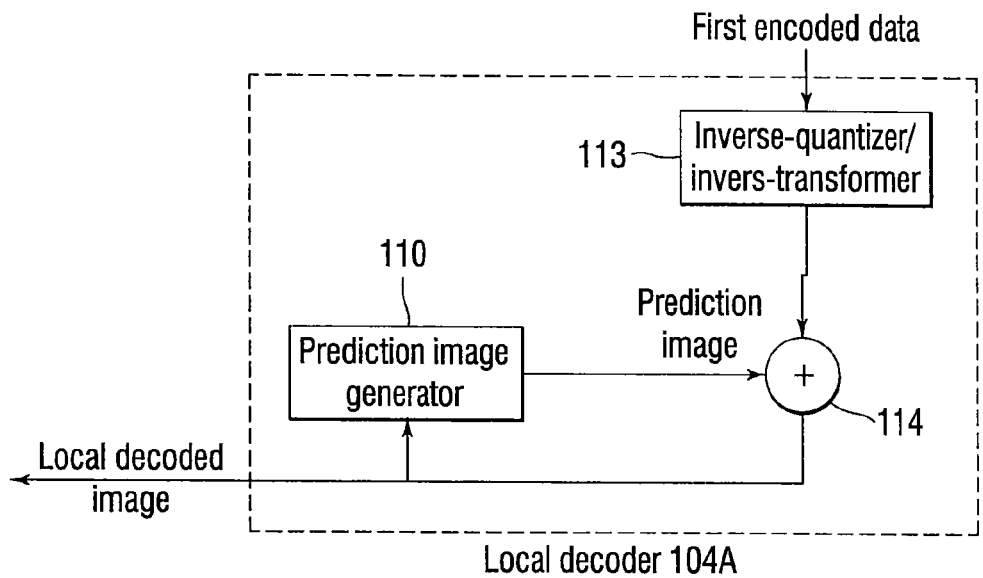
FIG. 3 is a block diagram illustrating a local decoder.

The local decoder 104A is described in detail referring to FIG. 3. The local decoder 104A includes a prediction image generator 110, an inverse-quantizer/inverse-transformer 113, and an adder 114. The inverse-quantizer/inverse-transformer 113 receives the encoded data from the first encoder 101. The inverse-quantizer/inverse-transformer 113 inverse quantizes quantized orthogonal transformation coefficients included in the encoded data according to the quantization parameter set by the controller 109. The inverse-quantizer/inverse-transformer 113 obtains the transform coefficients by performing an inverse quantizing process of the orthogonal transformation and generates a prediction error image. The inverse-quantizer/inverse-transformer 113 executes opposite processes of the transformer/quantizer 112. The prediction error image is sent to the adder 114.

The adder 114 receives the prediction image from the prediction image generator 110, and receives the prediction error image from the inverse-quantizer/inverse-transformer 113.

The adder 114 adds the prediction image and the prediction error image and generates the locally decoded image. The adder 114 sends the locally decoded image to the switch 106. If the mode determiner 105 described below selects the first encoding mode, the locally decoded image is used to predict following blocks.

The prediction image generator 110 performs processes in the same way as the prediction image generator 110 illustrated in FIG. 2. This will enable the first encoder 101 and the local decoder 104A to use the same prediction image. Meanwhile, the local decoder 104A may not include the prediction image generator 110. In that case, the prediction image generated by the first encoder 101 or the second encoder 102 may be directly sent to the local decoder 104A.

Figure 4:
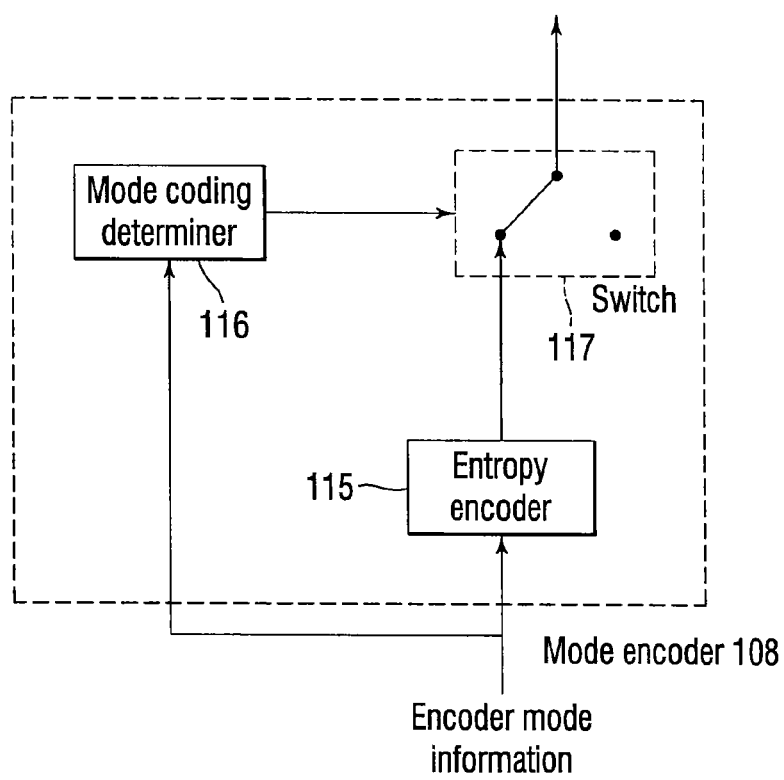
FIG. 4 is a block diagram illustrating a mode encoder.

The mode encoder 108 is described in detail referring to FIG. 4. The mode encoder 108 includes an entropy encoder 115, a mode coding determiner 116, and a switch 117.

The entropy encoder 115 receives the encoding mode information from the mode determiner 10, the encoding mode information indicating whether the inputted data is encoded by the first encoding mode or the second encoding mode. The entropy encoder 115 encodes the encoding mode information using an entropy encoding technique and generates a bit stream. The entropy encoder 115 sends the bit stream to the switch 117.

The mode coding determiner 116 receives the encoding mode information from the mode determiner 105. The mode coding determiner 116 determines whether to encode the encoding mode information or not. The mode coding determiner 116 sends a result of determination to the switch 117. Further details about the determination method process are described below.

The switch 117 receives the bit stream including an encoding mode from the entropy encoder 115 and the result of determination indicating whether to encode the encoding mode information from the mode coding determiner 116. If the result of determination indicates that the encoding mode information is to be encoded, the switch 117 outputs the bit stream. Otherwise the switch 117 does not output the bit stream.

Figure 5A:
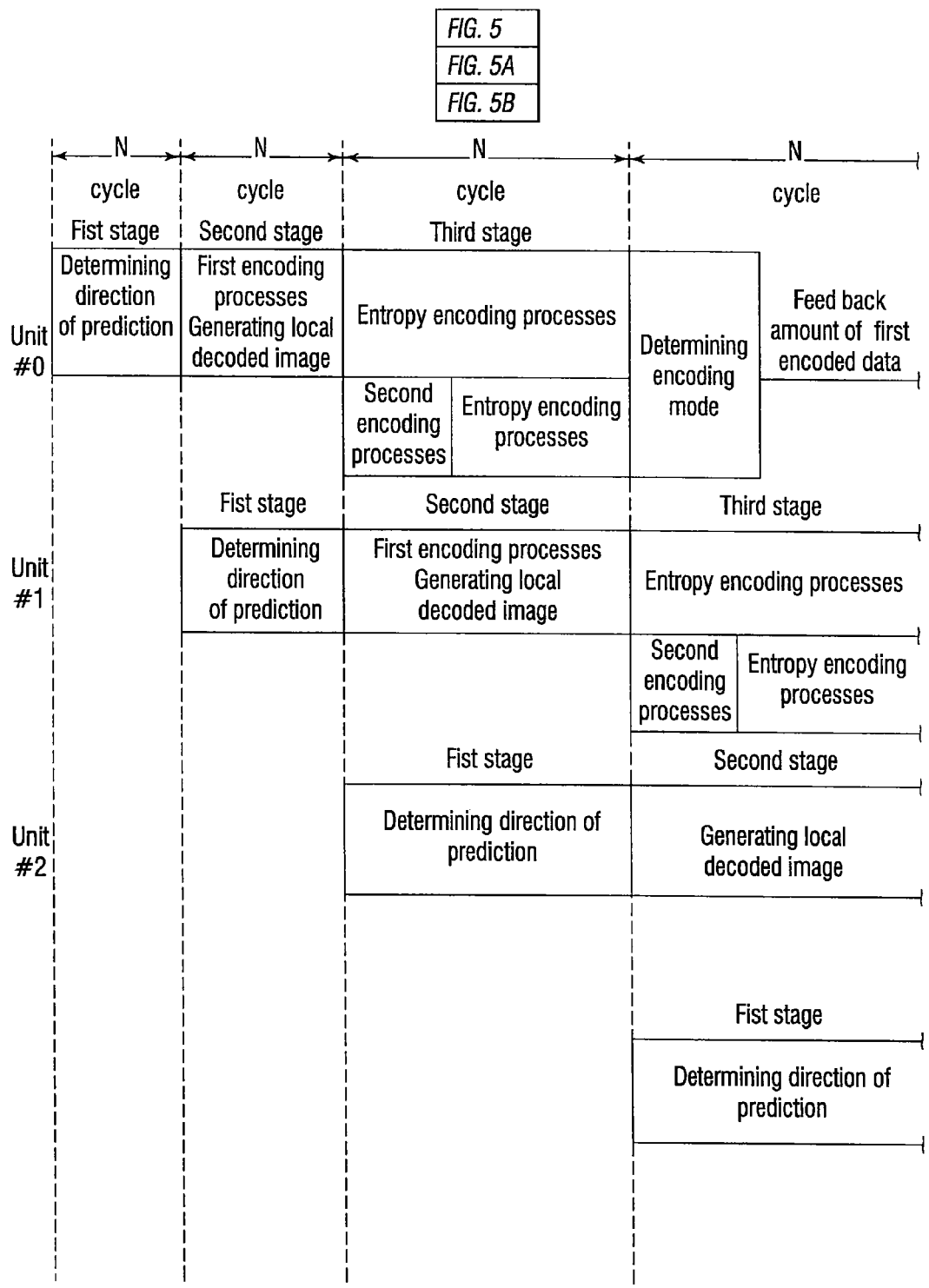
FIGS. 5A, 5B are flow charts illustrating operations executed by the image compression device.
Figure 5B:
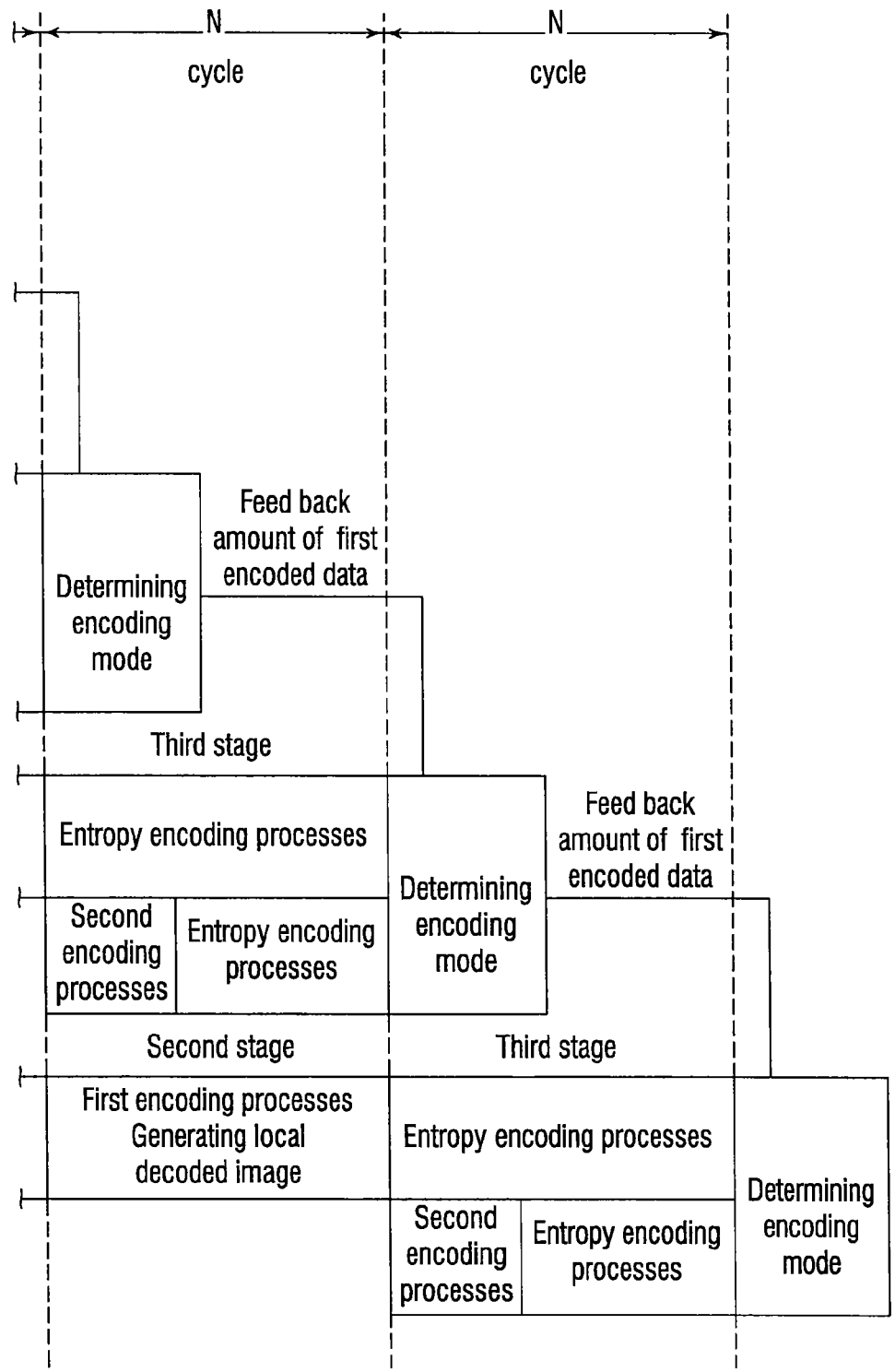

Next, the image compression device 100 will be described referring to FIGS. 5A, 5B and FIGS. 6A, 6B. FIGS. 5A, 5B is a timing chart illustrating processes to be performed by the image compression device 100. The image compression device 100 receives the inputted image and encodes each block according to timing chart illustrated in FIGS. 5A, 5B. The encoding process of each block, shown as different Unit #0 to Unit #3, is therefore undertaken sequentially in a pipeline process as illustrated in FIGS. 5A, 5B. The horizontal axis in FIGS. 5A, 5B is a time scale. The Unit #0 to Unit #3 are sequentially encoded in numerical order of unit number presented in the vertical axis.

(1) The controller 109 determines the direction of prediction and the encoding mode to be used.

(2) The first encoder 101 performs the encoding processes, and the local decoder 104A generates the locally decoded image.

(3) The entropy encoder 103A encodes using an entropy encoding technique.

The image compression device 100 executes each of steps (1)~(3) in N cycles (N is arbitrary natural number). At the cycle performing the third stage of entropy encoding processes, in parallel, the second encoder 102 performs the encoding processes, and the entropy encoder 103B encodes using entropy encoding technique. After that, the mode determiner 105 determines whether to use the first or the second encoding modes.

Figure 6A:
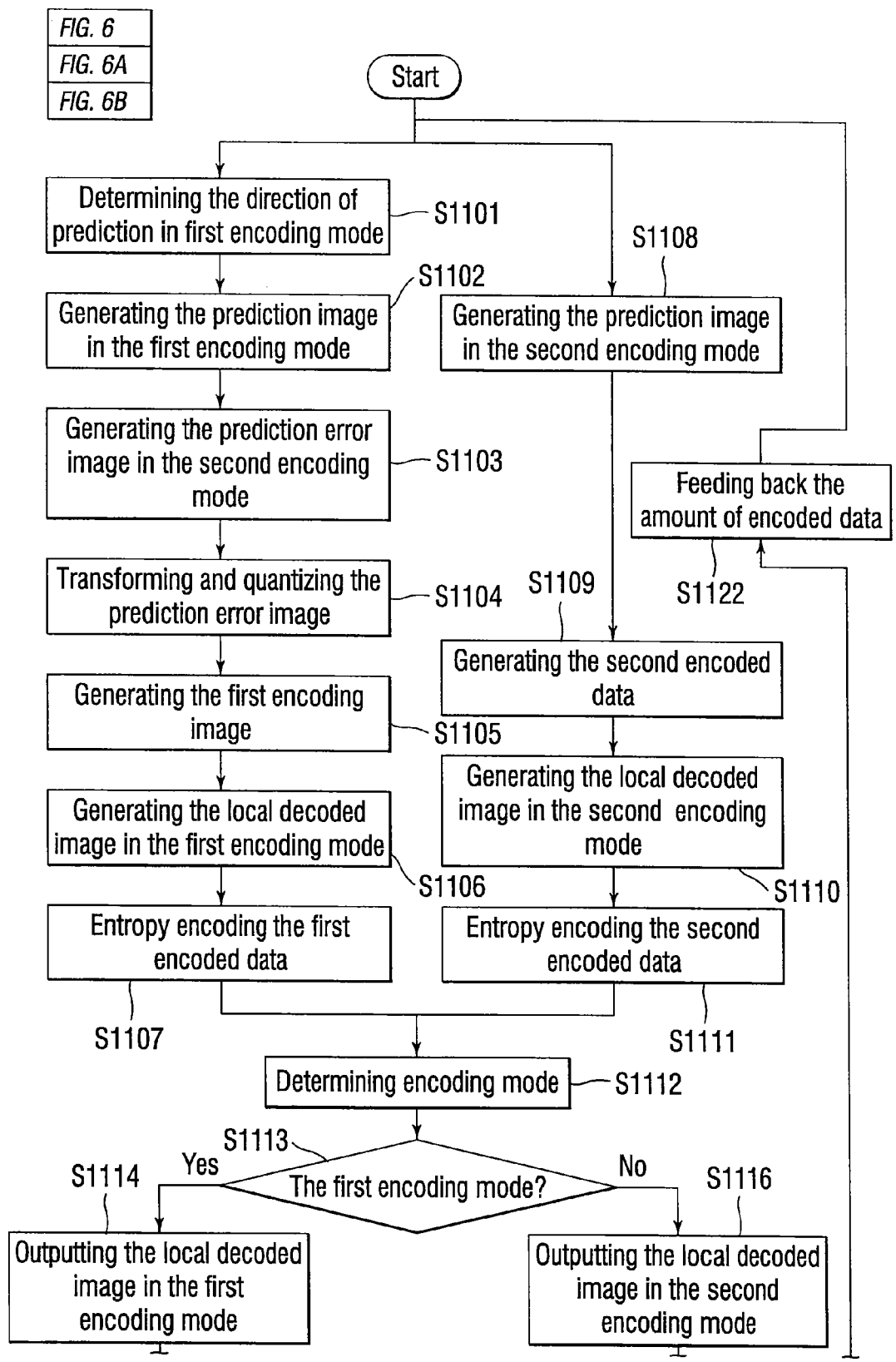
FIGS. 6A, 6B are flow charts illustrating operations executed by the image compression device.
Figure 6B:
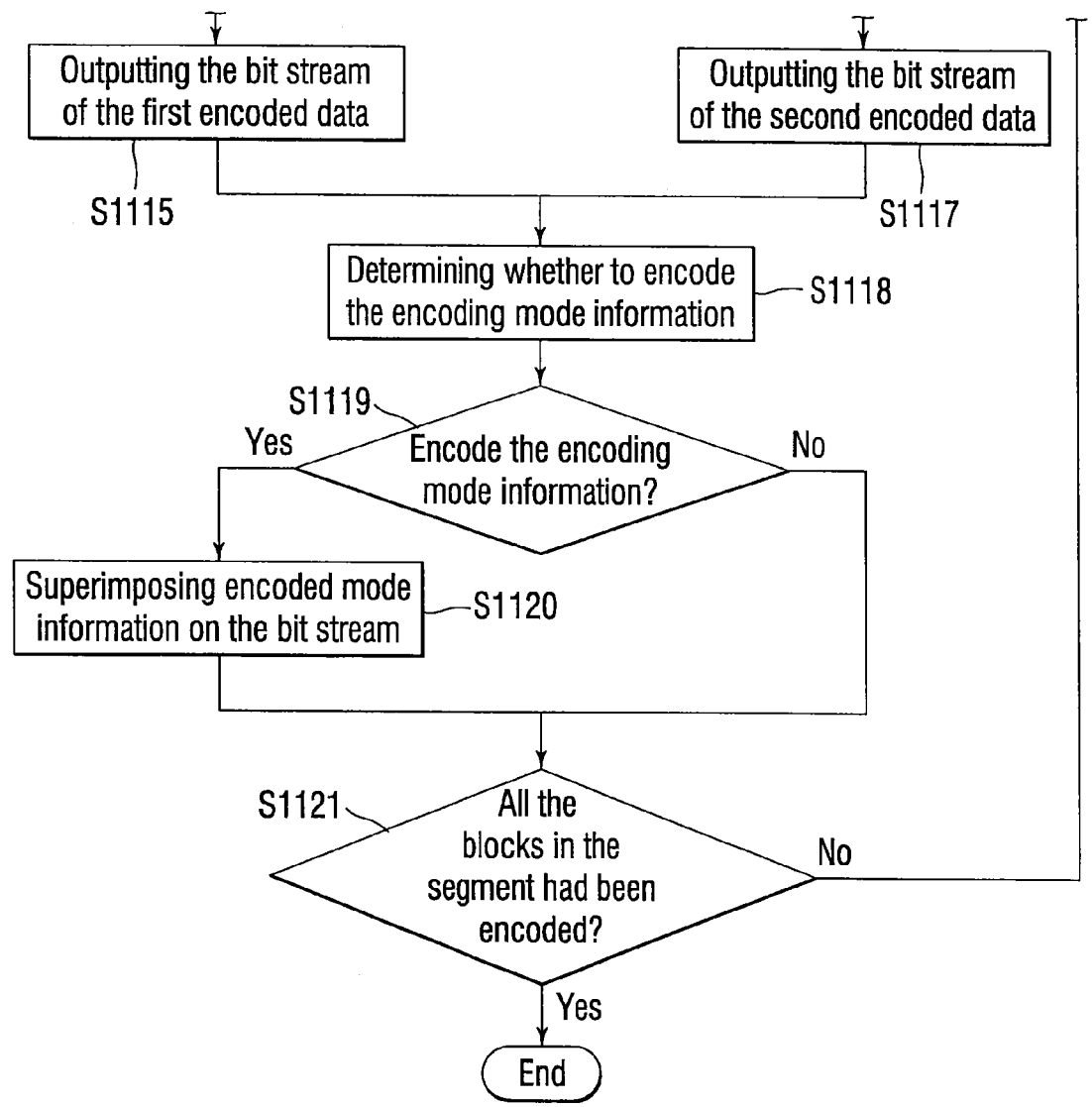

The determination process is described in detail referring to FIGS. 6A, 6B. FIGS. 6A, 6B is a flow chart illustrating an example of process flow executed by the image compression device 100. The image compression device 100 receives pixel data included in the target block in the inputted image and the controller 109 determines the direction of prediction used in the first encoding mode (S1101). As an example, the first encoder 101 performs an intra-prediction and transform/quantization processes as in a general encoding process. The direction of spatial prediction in the first encoding mode may be determined by any method. In this embodiment, the first encoder 101 selects the direction of spatial prediction which accomplishes the minimum residual error between the inputted image and the prediction image. S1101 is executed at the first stage of each Unit #0 to Unit #3 described in FIGS. 5A, 5B.

The prediction image generator 110 generates the prediction image in the first encoding mode by using pixel values in a neighboring block included in the locally decoded image according to the direction of prediction determined by the controller 109 (S1102). The subtractor 111 subtracts the inputted image from the prediction image and generates the prediction error image (S1103) in the second encoding mode. The quantized transformer 112 performs transform/quantization processes of the prediction error image and generates the quantized orthogonal transformation coefficients (S1104). The transformer/quantizer 112 generates the first encoded data (S1105). The first encoded data includes the quantized orthogonal transformation coefficients, the direction of prediction, and the quantization parameter. The first encoded data is sent to the local decoder 104A.

The local decoder 104A decodes the first encoded data by decoding processes corresponding to the encoding process performed by the first encoder 101 and generates the locally decoded image (S1106). The locally decoded image is sent to the switch 106. The processes S1102~S1106 are performed at a second stage of each block in FIGS. 5A, 5B.

The entropy encoder 103A encodes the first encoded data using an entropy encoding technique and generates the bit stream.

In S1101~S1107, the inputted image is encoded in the first encoding mode. The inputted image is also sent to the second encoder 102 and encoded in the second encoding mode. The second encoder 102 can use various techniques to encode the inputted image, the amount of encoded data encoded by the second encoder 102 being sufficiently less than that of encoded data encoded by the first encoder 101. It is preferable that the amount of encoded data encoded by the second encoder 102 is sufficiently smaller than the amount of encoded data encoded by the first encoder 101. In this embodiment, the second encoder 102 does not encode the quantized orthogonal transformation coefficients and uses the prediction image as the locally decoded image directly.

The encoding method executed by the second encoder 102 is not limited to the method described above.

The second encoder 102 generates the prediction image (S1108). The second encoder 102 generates the second encoded data (S1109). Further details or processes executed by the second encoder 102 and the second encoded data are described below. The second encoded data is sent to the local decoder 104B.

The local decoder 104B decodes the second encoded data using decoding processes corresponding to the encoding processes performed by the second encoder 102, and generates the locally decoded image (S1110). In the embodiment, the prediction image is directly used as the locally decoded image. Therefore, the local decoder 104B may directly use the prediction image received from the second encoder 102 as the locally decoded image and may generate the prediction image in the same way of prediction performed by the second encoder 102. The locally decoded image is sent to the switch 106.

The second encoded data is sent to the entropy encoder 103B. The entropy encoder 103B generates the bit stream by encoding the second encoded data using an entropy encoding technique (S1111).

S1107~S1111 are executed in third stage illustrated in FIGS. 5A, 5B, and the inputted image is encoded in this stage. In this embodiment, each block is encoded through three stages as described above. As shown in FIGS. 5A, 5B, each encoding process starts at intervals indifferent of the N cycles of one stage. A plurality of blocks are encoded by pipeline process. Processes executed in each cycle may include processes other than the processes described above. The number of stages may be an arbitrary number other than 3.

When the encoding processes through the three stages have finished, which of the encoding modes is to be applied is then determined. Either the bit stream of the first encoded data or the bit stream of the second encoded data is output according to the result of determination of the encoding mode generated through the encoding processes described above.

The mode determiner 105 receives the amount of encoded data of the target block from the entropy encoder 103A. The mode determiner 105 determines the encoding mode used in encoding the target block (S1112). The encoding mode information is sent to the switch 106, the switch 107, and the mode encoder 108. Further details about the mode determiner 105 are described below.

If the encoding mode information indicates the first encoding mode (S1113, yes), the switch 106 sends the locally decoded image, which is corresponding to the first encoding mode and received from the local decoder 104A, to the first encoder 101, and the second encoder 102 (S1114). The switch 107 outputs the bit stream corresponds to the first encoding mode and is received from the entropy encoder 103A (S1115).

If the encoding mode information indicates the second encoding mode (S1113, no), the switch 106 sends the locally decoded image, which is received from the local decoder 104B and corresponds to the second encoding mode, to the first encoder 101 and the second encoder 102 (S1116). The switch 107 outputs the bit stream which is received from the entropy encoder 103B and corresponding to the second encoding mode (S1117).

When the mode encoder 108 receives the encoding mode information indicating which of the first or second encoding modes has been selected, the mode coding determiner 116 determines whether to encode the encoding mode information or not (S1118). That is, the encoding mode information can be added to a segment and can indicate whether the segment is encoded in the first encoding mode or the second encoding mode. As discussed in detail below that encoding mode information need not always be utilized if the segment is encoded in the second encoding mode, which can thereby decrease overhead of the encoded data. The encoding mode information as also discussed below is utilized to determine which decoding scheme should be implemented, based on whether the encoding mode information indicates encoding in the first encoding mode or encoding in the second encoding mode. The result of determination is sent to the switch 117.

If the result of determination indicates that the encoding mode information is to be encoded (S1119, yes), the entropy encoder 115 encodes the encoding mode information. The encoded encoding mode information is superimposed on the bit steam of the encoded data outputted from the switch 107 (S1120).

If the result of the determination indicates that the encoding mode information is not to be encoded (S1119, no), thereby reducing overhead, the bit stream received from the switch 107 is directly outputted from the result of encoding. The branching operation at S1119 can be implemented by the switch 117.

If all of the blocks in the segment have not been encoded (S1121, no), the entropy encoder 103A generates the data amount information indicating the amount of encoded data of the target block currently encoded and sends the data amount information to the mode determiner 105 (S1122). The mode determiner 105 determines the encoding mode for encoding the next block to be encoded, based on relationship between the received data amount information and a target amount of encoded data set for all or the blocks in the segment. The data amount information is also sent to the controller 109 and is used when the controller 109 sets the quantization parameter.

If every block in the segment is encoded (S1121, yes), the compression device 100 terminates the processes of encoding the blocks in the segment.

As described above, the image compression device 100 executes the encoding processes.

FIG. 7 shows an example of syntax defining the encoded data of the block. In the syntax in FIG. 7, if "VARIABLE_CODEC_MODE" indicates "1" at the head of the encoded data, "codec_mode" that indicates the encoding mode information is encoded. Otherwise, "codec_mode" is not encoded and it indicates that the encoding mode is "MODE_2".

For example, "codec_mode" can be determined by 1 bit flag. "VARIABLE_CODEC_MODE" indicates a parameter that is set by the mode coding determiner 116 described below.

If the encoding mode information indicates the encoding process performed by the first encoder 101, in other words, if "codec_mode" indicates "MODE_1", "delta_qp" that indicates a difference between the quantization parameter of the most recently encoded block and the quantization parameter of the target block is encoded. Subsequently "pred_mode" that indicates the direction of intra prediction is encoded. "delta_qp" and "pred_mode" take within a predetermined range of values. Accordingly "delta_qp" and "pred_mode" can be encoded with a fixed code length. By encoding with a fixed code length, the bit stream can be decoded simply. When values in syntax are not varied, the fixed-length coding is more efficient than the variable-length coding. "coeff" indicating the quantized orthogonal transformation coefficients is encoded with a variable code length. "NUM_COEFF" indicates the number of the transform coefficients.

On the other hand, if the encoding mode information indicates that the target block is to be encoded in the second encoder 102 (i.e. "codec_mode" is "MODE_2"), "pred_mode" is encoded. The quantized orthogonal transformation coefficients are not encoded. Accordingly, "delta_qp" indicating the quantization parameter does not need to be encoded.

When the encoded data encoded in the second encoder 102 is selected, the quality of the inputted image is deteriorated. The second encoder 102 can encode the inputted image using a considerably smaller amount of encoded data than the amount of encoded data encoded in the first encoder 101. The syntax described above is a single example, some elements of syntax can be added or deleted based on the encoder. For example, the second encoder 102 may not encode any data and may just perform predetermined prediction processes. In this instance, the bit stream does not have the second encoded data, and the amount of encoded data always takes zero. The syntax may be converted according to components in the inputted image.

Next, detailed processes performed by the mode determiner 105 will be described. The mode determiner 105 receives the amount of encoded data from the entropy encoder 103A, calculates the accumulated amount of encoded data of the blocks included in the segments which have been already encoded, and stores the accumulated amount of encoded data in a memory (not shown). The mode determiner 105 determines the coding mode used to encode the target block based on the stored accumulated amount of encoded data and the received amount of encoded data of the target block encoded in the first encoding mode.

Figure 8:
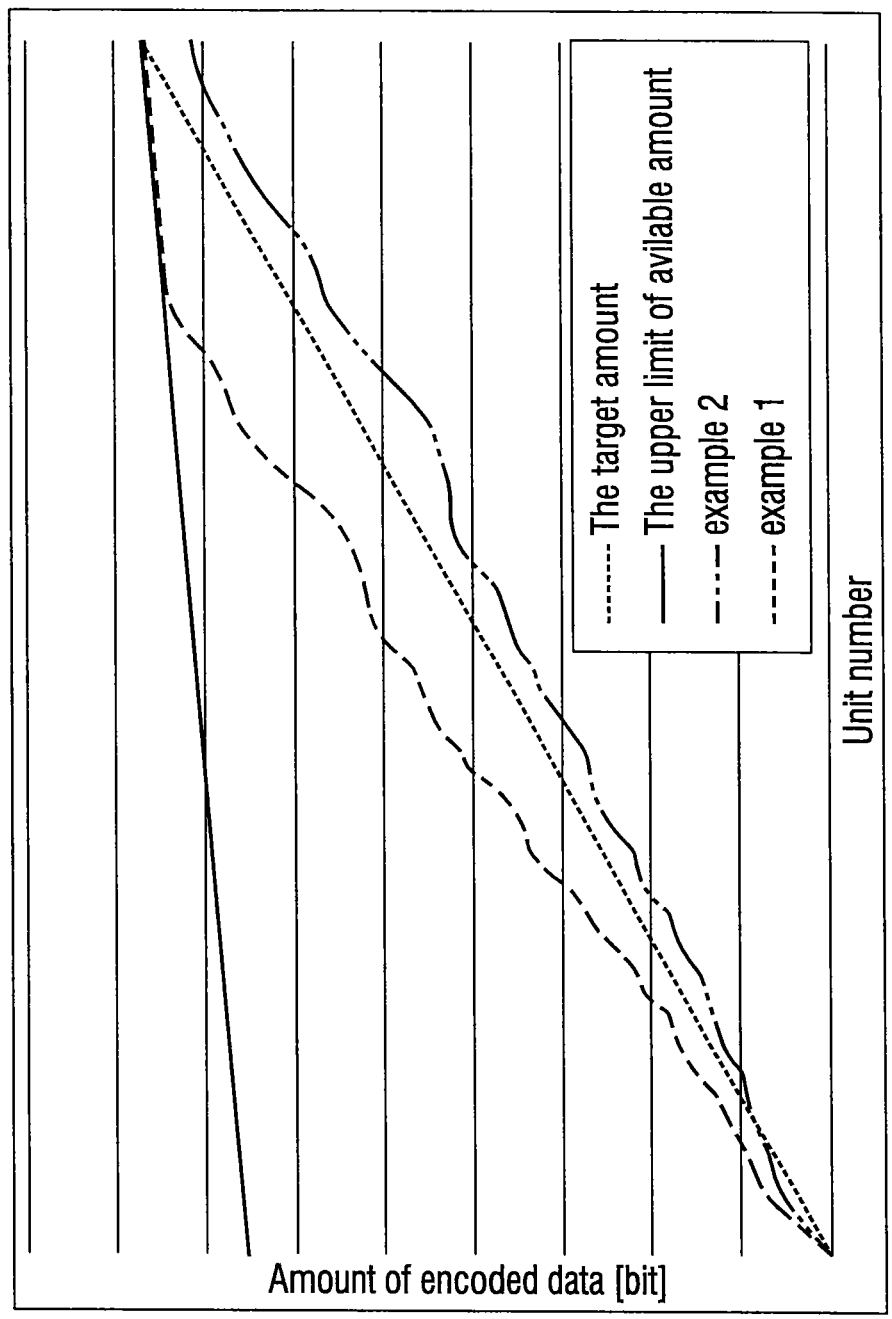
FIG. 8 is a graph for explaining the relation between a shift of an accumulated data amount and a determination of an encoding mode.

FIG. 8 is a graph illustrating a relationship between a shift of the amount of encoded data and a determination of the encoding mode. Details about the mode determiner 105 will be described referring to FIG. 8. The horizontal axis in FIG. 8 indicates a number of the blocks included in the segment. The vertical axis in FIG. 8 indicates an upper limit of an accumulated amount of the encoded data. The solid line in FIG. 8 indicates the upper limit of the accumulated amount of encoded data that guarantees the stream buffer will not overflow if all the remaining blocks in the segment are encoded in the second encoding mode. The broken narrow line in FIG. 8 indicates the target amount of encoded data.

In a general way, to accomplish a CBR (constant bit rate) the quantization parameter is controlled so that the amounts of encoded data of the blocks are nearly equal to each other. Although in the one-pass encoding scheme, the amount of encoded data does not always reach the target amount preliminarily determined. As shown in FIG. 8, the broken heavy line (example 1) and the chain double-dashed line (example 2) indicating the amount of encoded data of each block is not constant. The chain double-dashed line (example 2) is an exemplified upper limit of the accumulated amount of the encoded data that guarantees the stream buffer will not overflow if all the remaining blocks in the segment are encoded in the first encoding mode. If the actual accumulated amount of encoded data is below the solid line in FIG. 8, the block can be encoded in the first encoding mode.

The broken heavy line (example 1) in FIG. 8 is an exemplified accumulated amount of encoded data for which some blocks need to be encoded in the second encoding mode. In the case that the actual accumulated amount of encoded data in encoding the segment is above the upper limit solid line, the stream buffer will overflow if the encoding mode is not switched to the second encoding mode. The chain heavy line (example 2) is an exemplified accumulated amount of encoded data encoded in the first encoding mode that greatly exceeds the target amount of encoded data. All the remaining blocks in the segment are encoded in the second encoding mode to ensure the upper limit of the amount of encoded data is not exceeded.

To perform processes described above, the mode determiner 105 determines the encoding mode according to equations (1) and (2).

$$B_{available} = B_{target} - (B_{total} + B_{current}) \quad \text{equation (1)}$$

$$\begin{cases} \text{codec\_typr} = \text{MODE\_1} & \text{if } (B_{available} >= B_{min}U_{left}) \\ \text{codec\_type} = \text{MODE\_2} & \text{else} \end{cases} \quad \text{equation (2)}$$

"$B_{target}$" indicates the target amount of encoded data in the segment. "$B_{available}$" indicates the available amount of encoded data for the remaining blocks except in the segment for the target block. "$B_{total}$" indicates the accumulated amount of encoded data of the blocks which are encoded until just before the target block. "$B_{current}$" indicates the sum of the amount of encoded data of the target block encoded in the first encoding mode and an amount of encoded data needed to encode the encoding mode. $B_{available}$ can be obtained by subtracting $B_{total}$ and $B_{current}$ from $B_{target}$.

An example that the accumulated amount of the encoded data of the blocks which are encoded until just before the target block is fed back at the time of determining the encoding mode is described. Depending on timings of determination of the encoding mode and calculation of the amount of encoded data, the timing of feeding back the accumulated amount of the encoded data of the blocks which are encoded until just before the target block might be falling behind the timing of determination of the encoding mode. In such cases, the amount of encoded data of the block which has not been fed back is regarded as the maximum amount which may occur in encoding one block. For example, an estimated value of the maximum amount may be bits of the original block on the assumption that the delayed block is not encoded at all. A number of the delayed blocks may be changed depending on a configuration of pipeline processing or contents of processing.

Next, the equation (2) will be described. "$B_{min}$" indicates the sum of the amounts of encoded data of the target block encoded in the second encoding mode and the amount of the encoded data needed to encode the encoding mode. "U left" indicates a number of the remaining blocks in the segment. If the accumulated amount of encoded data when the target block is encoded in the first encoding mode is below the upper limit of the available amount of the encoded data, the target block will be encoded in the first encoding mode. Otherwise, the target block and the remaining blocks which are encoded after the target block are encoded in the second encoding mode to guarantee that the amount of encoded data is below the available amount of encoded data. As mentioned-above, the amount of encoded data is used for determining the encoding mode. However, the determination whether to encode the encoding mode information may be changed according to a specific condition.

Next, the mode encoder 108 will be described. The mode encoder 108 receives the encoding mode information from the mode determiner 105. After that, the mode coding determiner 116 determines whether to encode the encoding mode information. The mode coding determiner 116 can use any method to make that determination. The image decompression device 200 described below needs to obtain the same encoding mode information as the image compression device 100. In this embodiment, the encoding mode information indicating the first encoding mode is always encoded. And the encoding mode information indicating the second encoding is encoded when appearing first in the segment. As described above, once the second encoding mode is selected, all the remaining blocks in the same segment are encoded in the second encoding mode. Accordingly, the encoding mode of the remaining block is known, so the encoding mode information of the remaining block does not need to be encoded. The image decompression device 200 can determine the same encoding mode in the same way. If the mode coding determiner 116 determines to encode the encoding mode information, the encoding mode information is encoded by the entropy encoder 115 and is outputted as a bit stream.

In the syntax illustrated in FIG. 7, if the second encoding mode is selected more than once, "VARIABLE_CODEC_MODE" is set to 1. Otherwise "VARIABLE_CODEC_MODE" is set to 0.

As an example, a scheme that selects the encoding mode from two kinds of encoding modes is described above. The encoding modes may include other encoding modes. For example, the encoding mode to be applied may be selected from more than three encoding modes further including such as Chroma subsampling, and encoding process using PCM (pulse code modulation). In such cases, the encoding mode information of the second encoding mode is encoded at a first segment. And the encoding mode information of the second encoding mode is not encoded twice in the segment. By using such a rule, the amount of the encoding mode information can be minimized, thereby reducing overhead.

In this embodiment, by using the second encoding mode in addition to the first encoding mode, the amount of the second encoded data can be specified. It is thereby ensured that the total amount of encoded data in the segment does not exceed an upper limit by switching between the two encoding modes. Each block is usually encoded in the first encoding mode. But if the block is encoded at a time that the total amount of encoded data in the segment will exceed the upper limit value if the block is encoded in the first encoding mode, all the remaining blocks in the segment are encoded in the second encoding mode. Thereby certainly the total amount of encoded data is ensured not to exceed the upper limit value. As described above, by determining whether to encode the encoding mode information, overhead data of the second encoding mode can be reduced. Thereby the second encoding mode can as much as possible maintain image quality.

According to the configuration described above, the size of the stream buffer that will not cause overflow can be specified. Meanwhile, the minimum amount of encoded data is specified. By reducing overhead data, the blocks in a segment can be encoded by a general encoding mode (i.e. the first encoding mode) until just before the stream buffer overflows.

Second Embodiment

Figure 9:
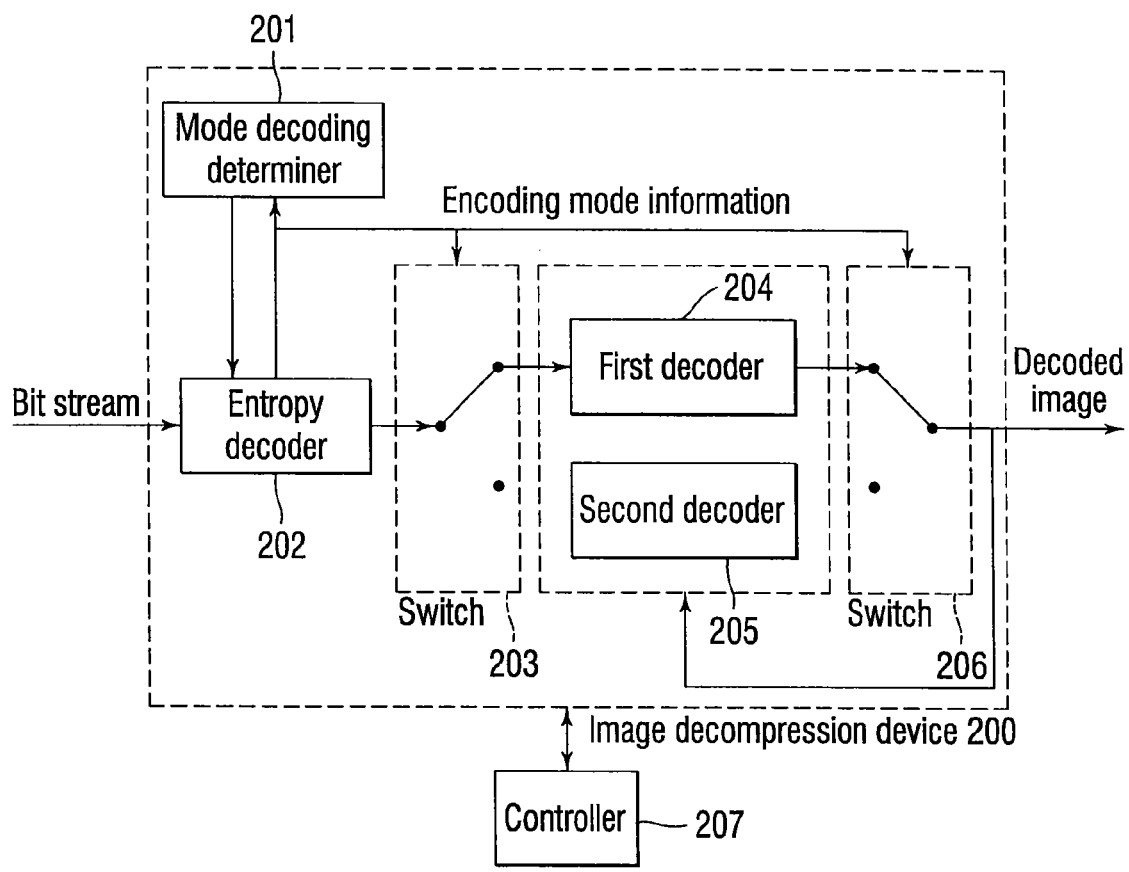
FIG. 9 is a block diagram illustrating an image decompression device.

An image decompression device 200 according to a second embodiment decodes the encoded data encoded by the image compression device 100 according to the first embodiment. FIG. 9 is a diagram illustrating the image decompression device 200.

The image decompression device 200 includes a mode decoding determiner 201, an entropy decoder 202, a switch 203, a first decoder 204, a second decoder 205, a switch 206, and a decoding controller 207.

The mode decoding determiner 201 receives the encoding mode information of the blocks encoded immediately prior to the target block from the entropy decoder 202. The mode decoding determiner 201 determines whether to decode the encoding mode information of the target block. After that, the result of determination is sent to the entropy decoder 202 as mode decoding information. Further details of the determination processes are described below. The entropy decoder 202 decodes the inputted bit stream by performing entropy decoding processes and obtains the encoded data. The entropy decoder 202 sends the encoded data to the switch 203. Likewise, the entropy decoder 202 decodes the encoding mode information to send to the mode decoding determiner 201, the switch 203, and the switch 206. The switch 203 receives the encoded data from the entropy decoder 202, to send to the first decoder 204 or the second decoder 205 according to the encoding mode information.

The first decoder 204 generates a decoded image by performing decoding processes corresponding to the encoding processes performed by the first encoder 101. The first decoder 204 sends the decoded image to the switch 206. Further details about the decoding process are described below. The first decoder 204 generates a decoded image by performing decoding processes corresponding to the encoding processes performed by the first encoder 101. The second decoder 205 generates a decoded image by performing decoding processes corresponding to the encoding processes performed by the second encoder 102. The second decoder 205 sends the decoded image to the switch 206. The switch 206 receives the decoded image from the first decoder 204 or the second decoder 205 according to the decoding mode information. The switch 206 outputs the decoded image and sends the decoded image to the first decoder 204 and the second decoder 205. The decoded image is used to decode following blocks as the prediction image. The controller 109 controls the first decoder 204 and the second decoder 205 via controlling the quantization process and the direction of prediction.

Figure 10:
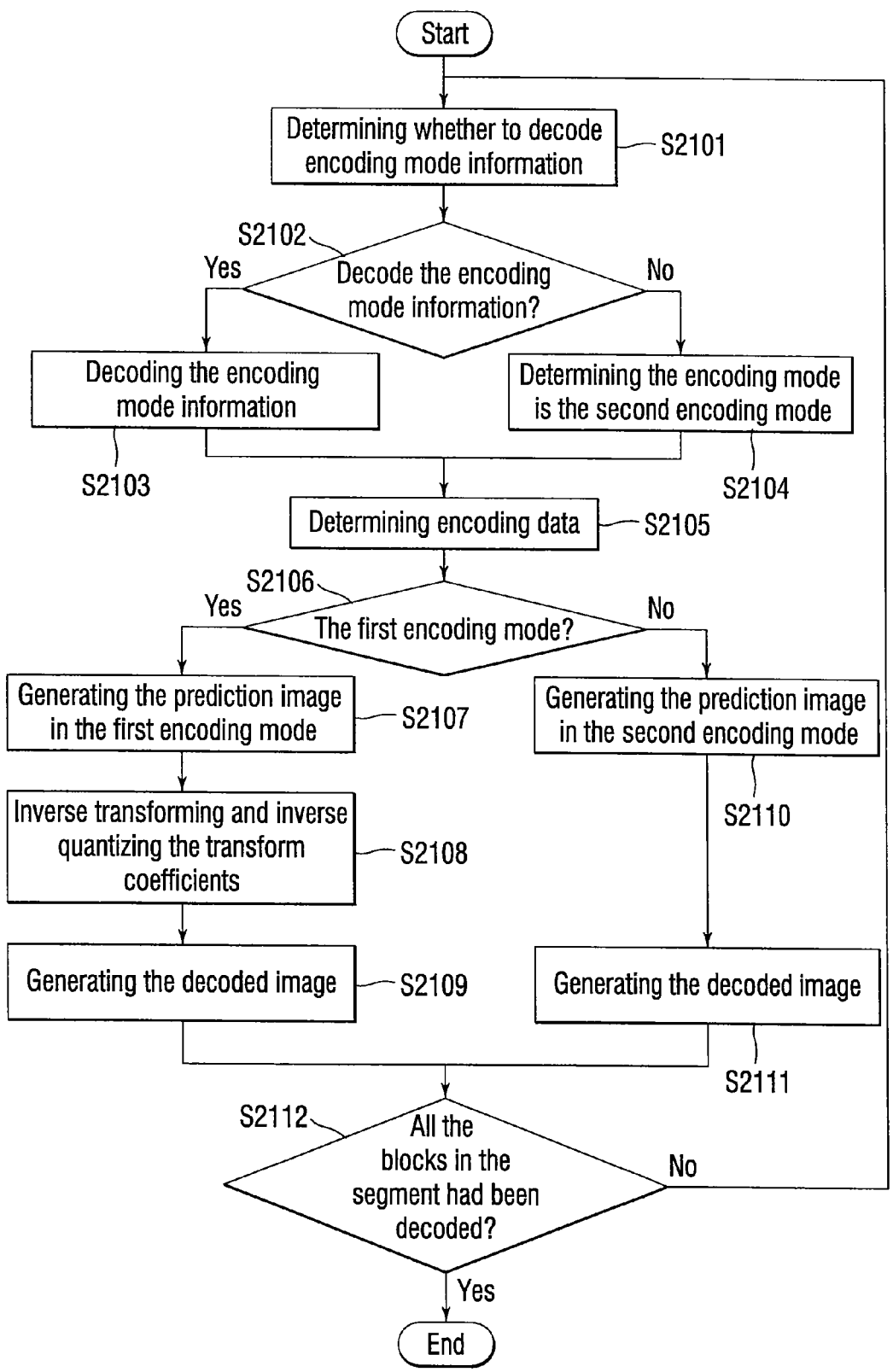
FIG. 10 is a flow chart illustrating operations executed by the image decompression device.

Next, the image decompression device 200 according to the second embodiment is described referring to FIG. 10. FIG. 10 is a flowchart showing how the image decompression device 200 operates. The image decompression device 200 receives the bit stream, and decodes the bit steam according to the syntax in FIG. 7.

The mode decoding determiner 201 determines whether to decode the encoding mode information (S2101). The result of determination is sent to the entropy decoder 202 as the mode decoding information. In the syntax illustrated in FIG. 7, if it is determined that the encoding mode is decoded, "VARIABLE_CODEC_MODE" is set to 1, or otherwise is set to 0. In other words, "VARIABLE_CODEC_MODE" indicates the mode decoding information.

If the mode decoding information indicates that the encoding mode information is to be decoded (S2102, yes), the entropy decoder 202 decodes "codec_mode" indicating the encoding mode (S2103).

On the other hand, if the mode decoding information indicates not to decode the encoding mode (S2102, no), the entropy decoder 202 assumes that "codec_mode" is set to "MODE_2" indicating the second encoding mode (S2104).

The encoding mode information is sent to the mode decoding determiner 201, the switch 203, and the switch 206.

The entropy decoder 202 decodes the encoded data of remaining blocks in the segment according to the mode decoding information as shown in FIG. 7 illustrating the exemplary syntax (S2105). The encoded data is sent to the switch 203. The switch 203 receives the encoding mode information and the encoded data from the entropy decoder 202 and outputs the encoded data either to the first decoder 204 or to the second decoder 205 according to the encoding mode information.

If the encoding mode information indicates the first encoding mode (S2106, yes), the encoded data is sent to the first decoder 204 and decoded by the first decoder 204. The first decoder 204 generates the prediction image based on the direction of prediction included in the encoded data (S2107). The first decoder 204 can obtain the same prediction image as the prediction image generated by the first encoder 101.

Next, the first decoder 204 performs inverse quantization/inverse transformation processes and generates the prediction error image (S2108). The inverse quantization/inverse transformation processes correspond to the transform coefficient that the first encoder 101 performed.

Next, the first decoder 204 adds the prediction image generated in S2107 to the prediction error image generated in S2108 and generates the decoded image (S2109). The generated decoded image is sent to the switch 206.

If the encoding mode information indicates the second encoding mode (S2106, no), the encoded data is sent to the second decoder 205 and is decoded. The second decoder 205 generates the prediction image used to decode the encoded data encoded in the second encoding mode (S2110). The second decoder 205 needs to generate the same prediction image as the prediction image generated by the second encoder 102. As described in the first embodiment, if the direction of prediction is not encoded, the image decompression device 200 may generate the prediction image according to the direction of prediction preliminarily shared with the image compression device 100. The second encoder 102 generates the decoded image using the prediction image (S2111). In this embodiment, the prediction image is directly outputted as the decoded image in the same way as in the first embodiment. In this embodiment, step S2111 is set explicitly as in the first embodiment, the prediction image generated in S2110 may be output directly as the decoded image.

The decoded image generated in S2107~S2109 or S2110~S2111 is sent to the switch 206, and outputted according to the encoding mode information. The decoded image is sent to the first decoder 204 and the second decoder 205, and is used to predict the following blocks as the prediction image.

If the entire block included in the target segment is not decoded (S2112, no), the operation returns to S2101 to decode the following blocks in the segment. If every block in the segment is decoded (S2112, yes), the decompression device 200 terminates the decoding process of the segment.

Next, operation of the mode decoding determiner 201 is described in detail. The mode decoding determiner 201 determines whether to decode the encoding mode information in the same way as the mode coding determiner 116 according to the first embodiment. The mode decoding determiner 201 usually determines to decode the encoding mode information of the blocks in the segment. However if the second encoding mode is selected in the segment at first, the mode decoding determiner 201 decides not to decode the encoding mode information of the remaining blocks in the segment, to thereby reduce overhead.

By determining whether to decode the encoding mode information in the same way of the mode coding determiner 116, the image decompression device 200 can obtain the same encoding mode information as the image compression device 100. Then, the overhead data in the second encoding mode can be reduced.

Third Embodiment

To reduce the overhead data, the image compression device 100 according to the first embodiment does not encode the encoding mode information if the predetermined condition is satisfied. However, the encoding mode information is needed to be encoded until the second encoding mode is selected in the first embodiment. In the third embodiment, an example that the encoding mode information is not consistently encoded is described.

Figures 11, 12:
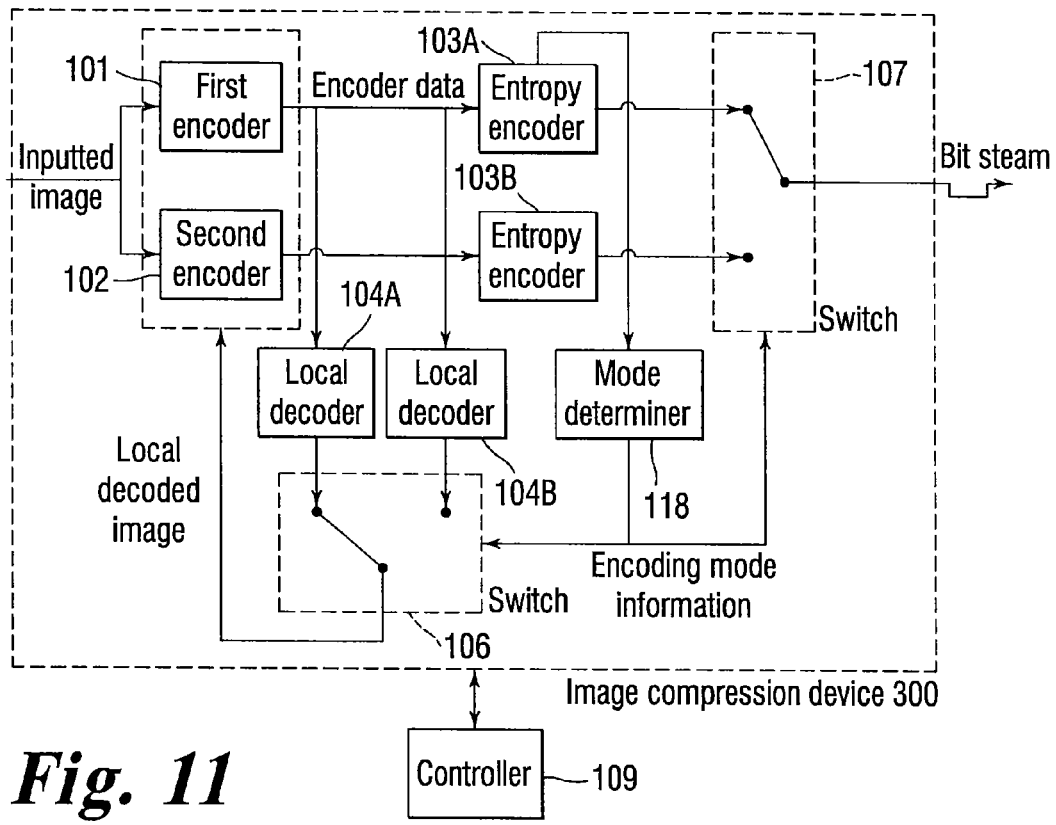
FIG. 11 is another example of an image compression device.
FIG. 12 is another example of syntax of encoded data

FIG. 11 illustrates an image compression device 300 according to the third embodiment. The image compression device 300 includes the first encoder 101, the second encoder 102, the entropy encoder 103A, the entropy encoder 103B, the local decoder 104A, the local decoder 104B, a mode determiner 118, the switch 106, the switch 107, and the controller 109.

The mode determiner 118 determines the encoding mode based on an accumulated amount of encoded data in a different way from the mode determiner 105 of the first embodiment. Further details about the determination process are described below. The image compression device 300 does not encode the encoding mode information of any blocks. FIG. 12 is an example showing a syntax of the encoded data in the block. The syntax in FIG. 12 is different from the syntax in FIG. 7 in the encoding mode information. The decompression device 400 corresponding to the compression device 200 has to obtain the same encoding mode, but the decompression device 400 cannot obtain it only from the syntax illustrated in FIG. 12. Hence, the decompression device also needs to determine the encoding mode information based on the amount of encoded data the same as in the compression device. Further details about an image decompression device 400 corresponding to the image compression device 300 are described in a fourth embodiment.

The mode determiner 118 according to the third embodiment calculates the available amount of encoded data "$B_{available}$" using an equation (3) instead of the equation (1).

$$B_{available} = B_{target} - (B_{total} + B_{max}) \qquad \text{equation (3)}$$

"$B_{max}$" presented in the equation (3) indicates the maximum bit number which can theoretically occur when it is encoded according to the first encoding mode. "$B_{max}$" can be stored as a fixed number in the compression device and the decompression device. Since both of the compression device and the decompression device determine the encoding mode by using common equations (2) and (3), they can obtain a common encoding mode.

The example that the encoding mode is not consistently encoded is described above. When three or more encoding modes are applied, the encoding mode may be encoded to distinguish the encoding mode other than the first and the second encoding modes. As a variation, the image compression device that performs a third encoding mode subtracting color will be described. In such a case, the mode encoder is needed in the same way as in the image compression device 100, but a way of determining whether to encode the encoding mode information is different from the image compression device 100.

Figure 13:
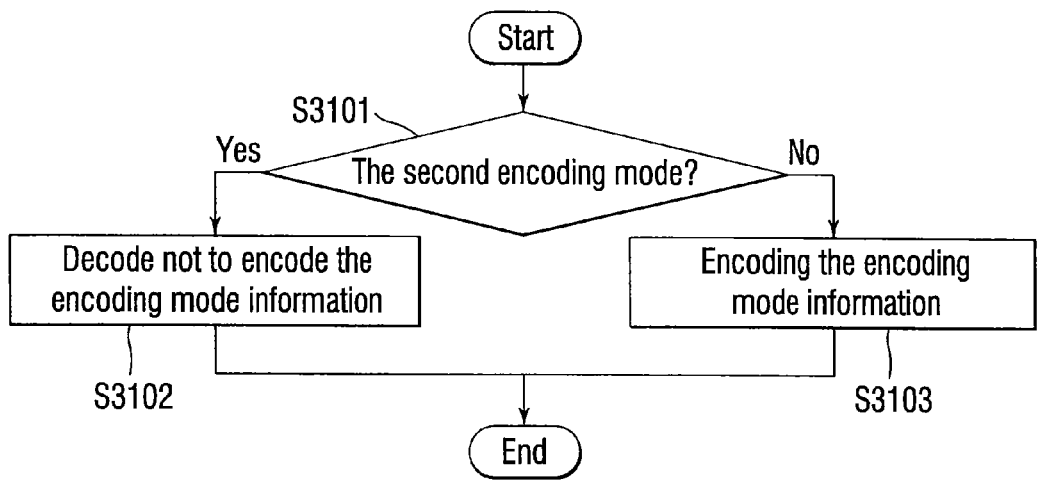
FIG. 13 is a flow chart illustrating determination processes to be performed by the image compression device.

FIG. 13 is a flowchart illustrating the determination processes whether to encode the encoding mode information. In this example, when the encoding mode information indicates the second encoding mode (S3101, yes), the encoding mode information is not encoded (S3102). On the other hand, if the encoding mode information indicates an encoding mode other than the second encoding mode (S3101, no), such as the first the encoding mode or a third encoding mode, the encoding mode information is encoded (S3103). If three encoding modes can be applied to the first embodiment, until before the second encoding mode is selected at first, 2 bits is consistently needed to obtain which of three encoding modes was applied in the case that the encoding mode information is simply encoded by a fixed code length simple fixed-length coding. On the other hand, in the third embodiment, when the second encoding mode is not selected in the segment at all, the compression device and the decompression device can determine whether either the first encoding mode or the third encoding mode was selected. Accordingly, the encoding mode information can be encoded by 1 bit.

As described above, on the premise that the compression device and the decompression device determine whether to select the second encoding mode in the same way, the overhead data needed to encode the encoding mode information can be reduced.

Fourth Embodiment

Figure 14:
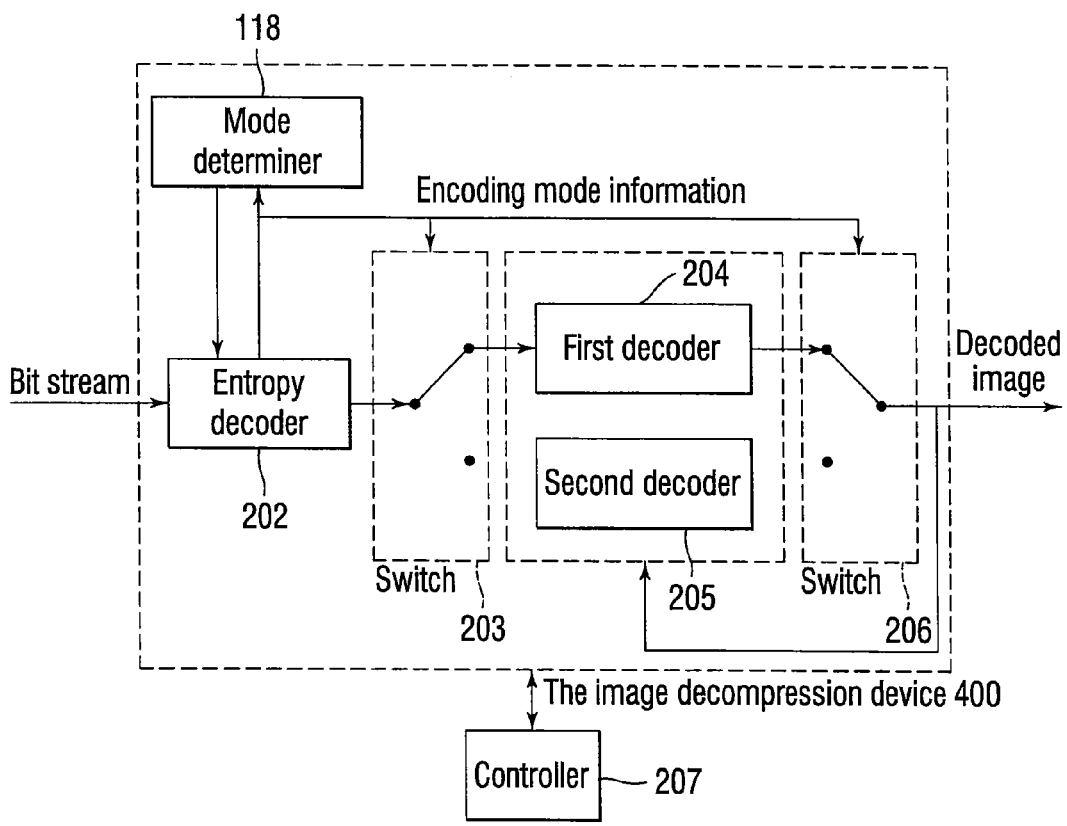
FIG. 14 is a block diagram illustrating another example of the image decompression device.

In this embodiment, the image decompression device 400 according to a fourth embodiment decodes the encoded data encoded by the image compression device 300 according to the third embodiment. FIG. 14 shows the image decompression device 400 according to the fourth embodiment.

The image compression device 400 includes the mode determiner 118, the entropy decoder 202, the switch 203, the first decoder 204, the second decoder 205, the switch 206, and the decoding controller 207.

Figure 15:
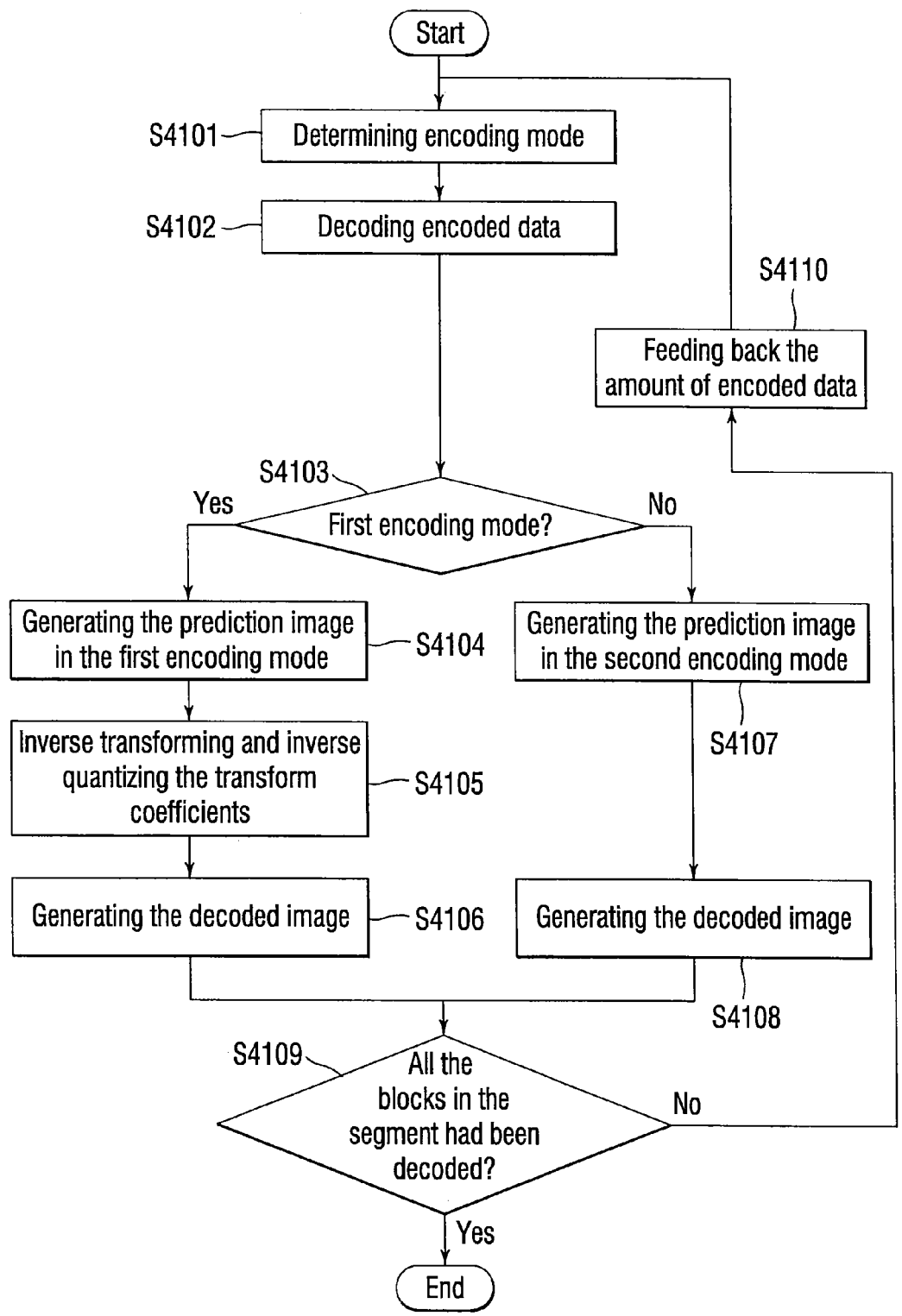
FIG. 15 is a flowchart illustrating another example of operations executed by the image decompression device.

Next, details about the image decompression device 400 according to the fourth embodiment will be described referring to FIG. 15. FIG. 15 is a flowchart showing an example of process flow executed by the image decompression device 400. When the bit stream is input to the image decompression device 200, the decoding processes according to the syntax described in FIG. 12 is executed.

The mode determiner 118 determines the encoding mode (S4101).

The mode determiner 118 determines the encoding mode using the equation (3). Accordingly, the image decompression device 400 can obtain the same encoding mode as the image compression device 300. The result of determination is set to the entropy decoder 202, the switch 203, and the switch 206 as the encoding mode information.

In S4102~S4109, the same processes are performed as the processes performed in S2015~S2112 in FIG. 10. The entropy encoder 202 decodes the encoded data based on the encoding mode information received from the mode determiner 118 according to the syntax described in FIG. 12 (S4102). The decoded data is sent to the switch 203. The switch 203 receives the encoding mode information and the encoded data from the entropy decoder 202, and sends the encoded data to either the first decoder 204 or the second decoder 205 according to the encoding mode information. If the encoding mode information indicates the first encoding mode (S4103, yes), the encoded data is sent to the first decoder 204 and decoded. The first encoder 101 generates the prediction image (S4104). Generating the same prediction image as the first encoder 101 according to the direction of prediction included in the encoded data. Next, the first encoder 101 performs inverse-quantization/inverse-transformation processes of the transform coefficient and generates the prediction error image (S4105). The decoded image is generated by adding the prediction image generated in S4104 to the prediction error image generated in S4105 (S4106). The decoded image is sent to the switch 206.

If the encoding mode information indicates the second encoding mode (S4103, no), the encoded data is sent to the second decoder 205 and is decoded. First of all, as the decoding processes corresponding to the second encoder 102, the second decoder 205 generates the prediction image according to the second encoding mode (S4107). The second decoder 205 needs to generate the same prediction image as the prediction image generated by the second encoder 102. As described in the first embodiment, if the direction of prediction is not encoded, the second decoder 205 may predict the image according to the direction preliminarily determined.

Subsequently, the second decoder 205 generates the decoded image using the prediction image (S4108). In this embodiment, the prediction image is directly output as the decoded image as in the first embodiment. As mentioned-above, the decoded image is sent to the switch 206, and is outputted according to the encoding mode information. Additionally, the decoded image is sent to the first decoder 204 and the second decoder 205, and is used as a reference image to predict the following block to be decoded in the segment.

If all the blocks in the segment have not been decoded (S4109, no), the operation returns to S4101 and remaining blocks are decoded. The entropy decoder 202 feeds back the amount of data which has been generated in encoding the target block to the mode determiner 118 (S4110). The mode determiner 118 accumulates the amount of encoded data fed back by the entropy decoder 202 by using the equations (2), (3) and determines the encoding mode in the same manner of the image compression device 300. On the other hand, if all the blocks in the segment are decoded (S4109, yes), the image decompression device 400 terminates the processes of decoding the blocks in the segment.

Meanwhile if three or more encoding modes exists, the decompression device 400 decodes the encoding mode to discriminate the encoding modes other than the second encoding mode as is the case with the image compression device 300. The encoding mode information can be obtained by executing corresponding processes to another example of the image compression device 300. Accordingly detailed explanation of those processes will be omitted.

In this embodiment, on the premise that the compression device and the decompression device determine whether to select the second encoding mode in the same way, the overhead data needed to encode the encoding mode can be reduced.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An image compression device comprising:
 a first encoder that encodes a target block included in a segment in a first encoding mode and obtains a first encoded data and an amount of first encoded data, the amount of the first encoded data not being a fixed value;
 a second encoder that encodes the target block in a second encoding mode using a fixed-length coding to obtain a second encoded data, an amount of the second encoded data being a predetermined bit number;
 a calculator that calculates an accumulated amount of the first encoded data of the blocks including the target block and blocks which are encoded before the target block and included in the segment;
 a selector that selects an encoding mode to be used to encode the target block from among the first encoding mode and the second encoding mode and generates encoding mode information indicating the selected encoding mode; and
 a determiner that determines whether to encode the encoding mode information according to a predetermined condition;
 wherein the selector selects the second encoding mode if a sum of the accumulated amount and an amount of the second encoded data of all remaining blocks in the segment exceeds a target value.

2. The device according to claim 1, wherein the determiner determines to encode the encoding mode information for a first segment for which the second encoding mode is selected.

3. The device according to claim 2, wherein the selector selects the second encoding mode for all remaining segments once the second encoding mode is selected in the segment.

4. The device according to claim 3, wherein the determiner determines not to encode the encoding mode information for blocks subsequent to the first segment encoded in the second encoding mode.

5. The device according to claim 1, wherein the determiner determines to encode the encoding mode information when the encoding mode information indicates the first encoding mode.

6. The device according to claim 1, wherein the calculator calculates the accumulated amount by summing the first encoded data of blocks which are encoded before the target block and a maximum amount of first encoded data of the target block,
 the selector selects the second encoding mode when the sum of the accumulated amount and amount of the second encoded data of all the remaining blocks exceeds the target value, and
 the determiner determines not to encode the encoding mode information that indicates the second encoding mode.

7. The device according to claim 6, wherein the selector selects the encoding mode of the target block before the first encoder encodes the target block.

8. The device according to claim 2, wherein the second encoder encodes the target block without use of prediction referring to a block which is encoded just before the target block.

9. The device according to claim 4, wherein the second encoder encodes the target block referring to a block that contacts an upper side of the target block and does not encode transformation/quantization coefficients.

10. An image decompression device, comprising:
 a determiner that determines whether to decode an encoding mode information of a target block included in a segment according to a first predetermined condition, the encoding mode information indicating a decoding mode to be used to decode the target block;
 an entropy decoder that decodes a bit stream and obtains the decoding mode selected from decoding modes including a first decoding mode and a second decoding mode from the decoded bit stream when the determiner determines to decode the encoding mode information, and that does not decode the encoding mode information and determines the decoding mode according to a second predetermined condition when the determiner determines not to decode the encoding mode information;
 a first decoder that decodes the target block in the first decoding mode when an amount of first encoded data of the target block to be decoded in the first decoding mode is not a fixed bit number;
 a second decoder that decodes the target block in the second decoding mode, when an amount of a second encoded data of the target block to be decoded in the second decoding mode is a predetermined bit number.

11. The device according to claim 10, wherein the determiner determines to decode the encoding mode information until the second decoding mode is selected at first in the segment, and determines not to decode the encoding mode information once the second decoding mode is selected in the segment, and the entropy decoder determines that the target block is to be decoded in the second decoding mode when the determiner determines not to decode the encoding mode information.

12. The device according to claim 10, wherein the determiner calculates the accumulated amount by summing the encoded data of blocks that are decoded before the target block and a maximum amount of first encoded data of the target block, and determines that the second decoding mode is to be used to decode the target block if the accumulated amount exceeds the target value.

13. The device according to claim 11, further comprising a third decoder that decodes the target block in a third decoding mode different from the first decoding mode, wherein an amount of third encoded data of the target block to be decoded in the third decoding mode is not a fixed bit number; and
 wherein the determiner calculates an accumulated amount by summing the encoded data of blocks that are decoded before the target block and a maximum amount of first encoded data of the target block, and determines to decode the encoding mode information if the accumulated amount does not exceed a target value, and
 the entropy decoder selects the decoding mode from the first and the third decoding mode from the decoded bit stream.

14. The device according to the claim 13, wherein the determiner determines not to decode the encoding mode information when the accumulated amount exceeds the target value, and the entropy decoder determines the second decoding mode is used to decode the target block when the determiner determines not to decode the encoding mode information.

15. The device according to claim 10, wherein the second decoder decodes the target block without use of prediction referring to a block which is encoded just before the target block.

16. The device according to claim 10, wherein the second decoder decodes the target block referring to a block that contacts an upper side of the target block and does not decode transformation/quantization coefficients.

17. An image compression method comprising:
- encoding a target block included in a segment in a first encoding mode and obtaining a first encoded data and an amount of first encoded data, the amount of the first encoded data being not a fixed value;
- encoding the target block in a second encoding mode using a fixed-length coding to obtain a second encoded data, an amount of the second encoded data being a predetermined bit number;
- calculating an accumulated amount of the first encoded data of the blocks including a target block and blocks which are encoded before the target block and included in the segment;
- selecting an encoding mode to be used to encode the target block from among the first encoding mode and the second encoding mode and generating encoding mode information indicating the selected encoding mode; and
- determining whether to encode the encoding mode information according to a predetermined condition;

wherein the selecting selects the second encoding mode if a sum of an accumulated amount and an amount of the second encoded data of all remaining blocks in the segment exceeds a target value.

18. An image decompression method, comprising:
- determining whether to decode encoding mode information of a target block included in a segment according to a first predetermined condition, the encoding mode information indicating a decoding mode to be used to decode the target block;
- decoding a bit stream and obtaining the decoding mode selected from the decoding modes including a first decoding mode and a second decoding mode from the decoded bit stream when the determining determines to decode the encoding mode information, and not decoding the encoding mode information and determining the decoding mode according to a second predetermined condition when the determiner determines not to decode the encoding mode information;
- decoding the target block in the first decoding mode, wherein an amount of first encoded data of the target block to be decoded in the first decoding mode is not a fixed bit number;
- decoding the target block in the second decoding mode, wherein an amount of a second encoded data of the target block to be decoded in the second decoding mode is a predetermined bit number.

* * * * *